United States Patent
Yem et al.

(10) Patent No.: US 11,429,204 B1
(45) Date of Patent: Aug. 30, 2022

(54) LIGHTING CONTROL METHOD OF OPTICAL POINTING DEVICE

(71) Applicant: PIXART IMAGING INC., Hsin-Chu (TW)

(72) Inventors: Poh-Weng Yem, Penang (MY); Wai-Lian Teo, Penang (MY)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 17/353,966

(22) Filed: Jun. 22, 2021

(51) Int. Cl.
*G06F 3/0354* (2013.01)
*G06F 3/03* (2006.01)
*H05B 47/105* (2020.01)
*G06T 7/40* (2017.01)
*G06V 10/60* (2022.01)

(52) U.S. Cl.
CPC ........ *G06F 3/03543* (2013.01); *G06F 3/0304* (2013.01); *G06T 7/40* (2013.01); *G06V 10/60* (2022.01); *H05B 47/105* (2020.01)

(58) Field of Classification Search
CPC ..... G06F 3/0304; G06F 3/03543; G06T 7/40; G06V 10/60; H05B 47/105
See application file for complete search history.

(56) References Cited

U.S. PATENT DOCUMENTS

| | | | |
|---|---|---|---|
| 2005/0195169 A1* | 9/2005 | Lin | G06F 3/0317 345/163 |
| 2010/0289745 A1* | 11/2010 | Lye | G06F 3/038 345/166 |
| 2014/0292657 A1* | 10/2014 | Chen | G06F 3/0317 345/166 |

* cited by examiner

*Primary Examiner* — Premal R Patel
(74) *Attorney, Agent, or Firm* — Li & Cai Intellectual Property (USA) Office

(57) ABSTRACT

A lighting control method of an optical pointing device is provided. An electric current is applied to a light emitting element within a predetermined turned-on period of an image sampling cycle, so that the light emitting element generates a light beam projected on a work surface where the optical pointing device is placed. A surface image of the work surface is captured by an image sensor within the predetermined turned-on period of the image sampling cycle. The surface image is analyzed to obtain a brightness of the surface image within the image sampling cycle. A current value of the electric current applied to the light emitting element according to the brightness of the surface image is determined before a starting point of a next image sampling cycle, such that a brightness of another surface image captured during the next image sampling cycle is maintained within a predetermined range.

12 Claims, 6 Drawing Sheets

LIGHTING CONTROL METHOD OF OPTICAL POINTING DEVICE

FIELD OF THE DISCLOSURE

The present disclosure relates to a lighting control method, and more particularly to a lighting control method of an optical pointing device.

BACKGROUND OF THE DISCLOSURE

Generally, a conventional optical mouse includes a light emitting diode (LED) and an image sensor. When the conventional optical mouse is operated on a surface, the light emitting diode emits a light beam to the surface, so that an image of the surface can be captured by the image sensor. Thereafter, the images respectively captured at different time points are all transmitted to an image processor, and the image processor can compare a pixel difference between two images that are respectively captured at two different time points. According to the pixel difference between the captured images, a movement distance of the optical mouse between the two different time points can be obtained.

When the conventional optical mouse is operated on a lighter colored surface, a shutter open time of the image sensor is shorter. However, when the conventional optical mouse is operated on a darker colored surface, a longer shutter open time of the image sensor and/or a longer pre-flash time of the light emitting diode are required to ensure that the captured image is bright and clear enough to be analyzed. Accordingly, when the conventional optical mouse is operated on the darker colored surface, a frame rate of the image sensor, i.e., the frequency at which the image sensor captures images, is limited due to the longer shutter time or the longer pre-flash time, thereby negatively affecting the tracking speed and the acceleration performance of the conventional optical mouse.

Furthermore, when the conventional optical mouse is moved from the darker colored surface to the lighter colored surface, the frame rate of the image sensor is changed, and vice versa. When the conventional optical mouse is operated to move continuously across a mouse pad having alternately-distributed darker and lighter colored regions, the frame rate of the image sensor is frequently changed. Since the frame rate of the image sensor affects the tracking speed and the acceleration performance of the conventional optical mouse, for operation of certain types of optical mouse (especially a gaming mouse), frequent changes of the frame rate may be a source of annoyance for a user during operation.

SUMMARY OF THE DISCLOSURE

In response to the above-referenced technical inadequacies, the present disclosure provides a lighting control method of an optical pointing device. When the optical pointing device continuously moves across a surface having alternately-distributed darker and lighter colored regions, the lighting control method of the optical pointing device can avoid frequent changes of a frame rate of an image sensor.

In one aspect, the present disclosure provides a lighting control method of an optical pointing device, which includes: applying an electric current to a light emitting element within a predetermined turned-on period of an image sampling cycle so that the light emitting element generates a light beam that is projected on a work surface where the optical pointing device is placed; capturing a surface image of the work surface by an image sensor within the predetermined turned-on period of the image sampling cycle; analyzing the surface image and obtaining a brightness of the surface image within the image sampling cycle; and determining a current value of the electric current applied to the light emitting element according to the brightness of the surface image before a starting point of a next image sampling cycle, such that a brightness of another surface image captured during the next image sampling cycle is maintained within a predetermined range.

In certain embodiments, during the step of determining the current value of the electric current, a length of the predetermined turned-on period is not changed.

In certain embodiments, the step of determining the current value of the electric current according to the brightness of the surface image includes: determining whether the brightness of the surface image falls within or outside of the predetermined range; in response to the brightness of the surface image falling outside of the predetermined range, adjusting the current value of the electric current applied to the light emitting element; and in response to the brightness falling within the predetermined range, maintaining the current value of the electric current without changing a length of the predetermined turned-on period.

In certain embodiments, the step of adjusting the current value of the electric current applied to the light emitting element includes: determining whether the brightness of the surface image falls within, above or below the predetermined range; in response to the brightness of the surface image falling below the predetermined range, determining whether the electric current reaches a preset maximum value; in response to the electric current reaching the preset maximum value, adjusting at least one of an amplifier gain or the length of the predetermined turned-on period; and in response to the electric current not reaching the preset maximum value, increasing the current value of the electric current.

In certain embodiments, the predetermined turned-on period includes a pre-flash stage and an open shutter stage. When the electric current reaches the preset maximum value, at least one of durations of the pre-flash stage and the open shutter stage is prolonged so as to change the length of the predetermined turned-on period.

In certain embodiments, the predetermined turned-on period includes an open shutter stage. When the electric current reaches the preset maximum value, a duration of the open shutter stage is prolonged so as to change the length of the predetermined turned-on period.

In certain embodiments, the step of adjusting the current value of the electric current applied to the light emitting element further includes: in response to the brightness of the surface image falling above the maximum value of the predetermined range, decreasing the current value of the electric current.

In certain embodiments, the surface image has a plurality of pixels respectively having brightness values. The step of analyzing the surface image to obtain the brightness of the surface image within the image sampling cycle includes: calculating a statistical data according to the brightness values of the pixels, in which the statistical data includes at least one of an accumulation, an average, a maximum, a minimum, a mean, a variance, a standard deviation of the brightness values, and a count of saturated pixels.

In certain embodiments, the statistical data includes the accumulation and the maximum of the brightness values, and the step of determining whether the brightness of the surface image falls within or outside of the predetermined range further includes: determining whether the accumulation of the brightness value falls within a first brightness range and whether the maximum of the brightness values falls within a second brightness range; and determining that the brightness of the surface image falls outside of the predetermined range when the accumulation of the bright values does not fall within the first brightness range or the maximum of the brightness value does not fall within the second brightness range.

In certain embodiments, the step of determining whether the brightness of the surface image falls within or outside of the predetermined range further includes: when the accumulation of the bright values falls within the first brightness range and the maximum of the brightness value falls within the second brightness range, determining that the brightness of the surface image is maintained within the predetermined range.

In certain embodiments, the step of determining the current value of the electric current according to the brightness of the surface image includes: determining whether the brightness of the surface image falls within or outside of the predetermined range; in response to the brightness of the surface image falling outside of the predetermined range, adjusting the current value of the electric current applied to the light emitting element and adjusting at least one of an amplifier gain and a length of the predetermined turned-on period; and in response to the brightness falling within the predetermined range, maintaining the current value of the electric current without changing a length of the predetermined turned-on period.

In certain embodiments, during the step of analyzing the surface image and obtaining the brightness of the surface image, the light emitting element is turned off for a predetermined turned-off period in the image sampling cycle.

Therefore, in the lighting control method of the optical pointing device provided by the present disclosure, by virtue of "determining a current value of the electric current applied to the light emitting element according to the brightness of the surface image before a starting point of a next image sampling cycle, such that a brightness of another surface image captured during the next image sampling cycle is maintained within a predetermined range," the frame rate of the image sensor can usually be maintained at a preset value, and is not frequently changed.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
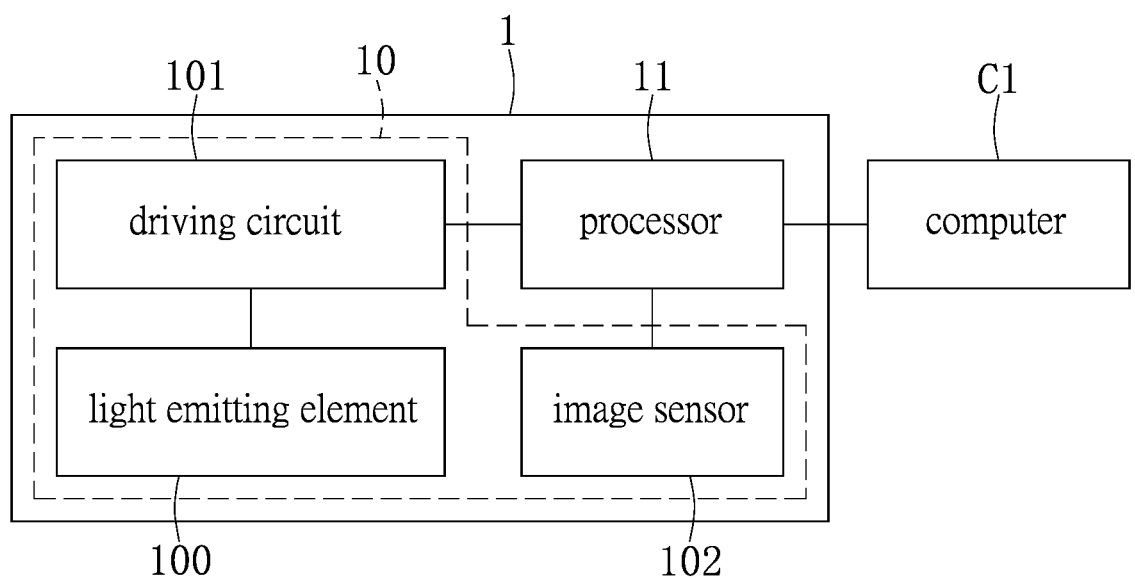
FIG. 1 is a functional block diagram of an optical pointing device that is electrically connected to a computer according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, in which FIG. 1 is a functional block diagram of an optical pointing device that is electrically connected to a computer according to one embodiment of the present disclosure. An optical pointing device 1 can be an optical mouse and adapted to be electrically coupled to a computer C1, so that a user can control a cursor position displayed on a screen (not shown in FIG. 1) of the computer C1 through moving the optical pointing device 1.

Specifically, the optical pointing device 1 includes an optical sensor 10 and a processor 11 electrically connected to the optical sensor 10. When the optical pointing device 1 is placed on a work surface and moved for a distance, the optical sensor 10 is configured to capture a plurality of surface images of the work surface. The work surface may be a surface of a mouse pad, a desk, a paper, or any object, and the work surface may have alternately-distributed darker and lighter colored regions.

Since the optical sensor 10 is used to capture the surface images of the work surface, the optical sensor 10 includes a light emitting element 100, a driving circuit 101, and an image sensor 102. The light emitting element 100 can be, for example, an LED, and configured to generate a light beam projecting on the work surface. The driving circuit 101 is electrically connected to the light emitting element 100, so as to control the light emitting element 100 to turn on and off of an electric current applied to the light emitting element 100. An intensity of the light beam generated by the light emitting element 100 can vary with a value of the electric current applied to the light emitting element 100. Accordingly, the intensity of the light beam generated by the light emitting element 100 can be adjusted, so that the surface image with certain brightness can be obtained and analyzed.

In the instant embodiment, the electric current applied to the light emitting element 100 can be adjusted based on whether a color of the region on which the optical pointing device 1 is placed is darker or lighter, so that the intensity of the light beam generated by the light emitting element 100 can be adjusted. As such, the brightness of the captured surface image can be maintained at a predetermined level. A detailed description of adjusting the electric current applied to the light emitting element 100 will be provided later, and is not described herein.

When the light emitting element 100 is turned on by the driving circuit 101 and then generates a light beam projecting on the work surface, the image sensor 102 can capture the surface image of the work surface. In one embodiment, the image sensor 102 captures the surface images at a preset frame rate. In the present disclosure, the frame rate refers to a quantity of the surface images that are captured by the image sensor 102 per second. Furthermore, the frame rate of the image sensor 102 can be preset to satisfy different requirements with respect to different manners of operation of the optical pointing device 1. For example, when the optical pointing device 1 is a gaming mouse, the preset frame rate can be higher to satisfy operating requirements for the user, but the present disclosure is not limited thereto. Compared to a conventional method, in the present disclosure, whether the optical pointing device 1 is moved over to the dark-colored region or the light-colored region, the frame rate of the image sensor 102 can usually be maintained at the preset value during the operation of the optical pointing device 1, rather than being frequently changed.

The processor 11 is electrically connected to the driving circuit 101 and the image sensor 102. The processor 11 receives the surface images captured by the image sensor 102 and processes the surface images, so as to obtain a count (of pixels) that corresponds to a movement distance of the optical pointing device 1. Specifically, the processor 11 obtains the count of pixels that corresponds to the movement distance of the optical pointing device 1 according to two surface images that are captured at different time points. Accordingly, the brightness and the sharpness of each of the surface images captured by the image sensor 102 affect the sensitivity of the optical pointing device 1. If the surface image is too dark or too bright to be recognized, the performance of the optical pointing device 1 will be negatively affected.

In the instant embodiment, the processor 11 can analyze the surface image and determine whether the brightness of the surface image is maintained within a predetermined range. When the brightness of the surface image falls outside of the predetermined range, the current value of the electric current applied to the light emitting element 100 is adjusted by the processor 11 through the driving circuit 101, so that the brightness of the surface image captured by the image sensor 102 can be maintained within the predetermined range.

Specifically, when the brightness of the surface image is less than a minimum value of the predetermined range, the processor 11 controls the driving circuit 101 to increase the electric current applied to the light emitting element 100, so that the brightness of the surface image can be increased and then fall within the predetermined range. On the contrary, when the brightness of the surface image is greater than a maximum value of the predetermined range, the processor 11 controls the driving circuit 101 to decrease the electric current applied to the light emitting element 100, so that the brightness of the surface image can be decreased and then fall within the predetermined range.

Additionally, the processor 11 can also control the light emitting element 100 through the driving circuit 101 and control the image sensor 102 to repeat image sampling cycles, and each of the image sampling cycles includes a predetermined turn-on time and a predetermined turn-off time. Specifically, the processor 11 controls the light emitting element 100 to be turned on and applied with the electric current for a predetermined turned-on period, and then to be turned off for a predetermined turned-off period through the driving circuit 101.

The aforementioned predetermined turned-on period may include a pre-flash stage and an open shutter stage. During the open shutter stage, the processor 11 can control the image sensor 102 to open a shutter of the image sensor 102, so as to capture the surface image. The longer a duration of the open shutter stage is, the longer a length of the predetermined turned-on period and a time length of each image sampling cycle are. However, under a situation where the intensity of the light beam generated from the light emitting element 100 is not adjusted, when the working surface is of a darker color, the duration of the shutter open stage needs to be prolonged, so that the image sensor 102 can easily capture a clear surface image.

Accordingly, the processor 11 may adjust the duration of the open shutter stage according to the brightness of the surface image received from the image sensor 102. However, in one embodiment of the present disclosure, the duration of the open shutter stage is not adjusted unless the electric current applied to the light emitting element 100 has reached a preset maximum value.

During the predetermined turned-off period of one of the image sampling cycles, the light emitting element 100 is turned off, and the processor 11 receives the surface image captured by the image sensor 102, so as to process and analyze the surface image. Furthermore, during a process in which the processor 11 processes and analyzes the surface image, if the processor 11 determines that the surface image captured by the image sensor 102 is not bright enough to be analyzed, and that the current value of the electric current has reached the preset maximum value, the processor 11 would adjust an amplifier gain to increase the brightness of the surface image. That is to say, when the optical pointing 1 is moved over the dark-colored region or the light-colored region, adjusting the intensity of the light beam generated from the light emitting element 100 takes priority over adjusting the duration of the open shutter stage and the amplifier gain.

Figure 2:
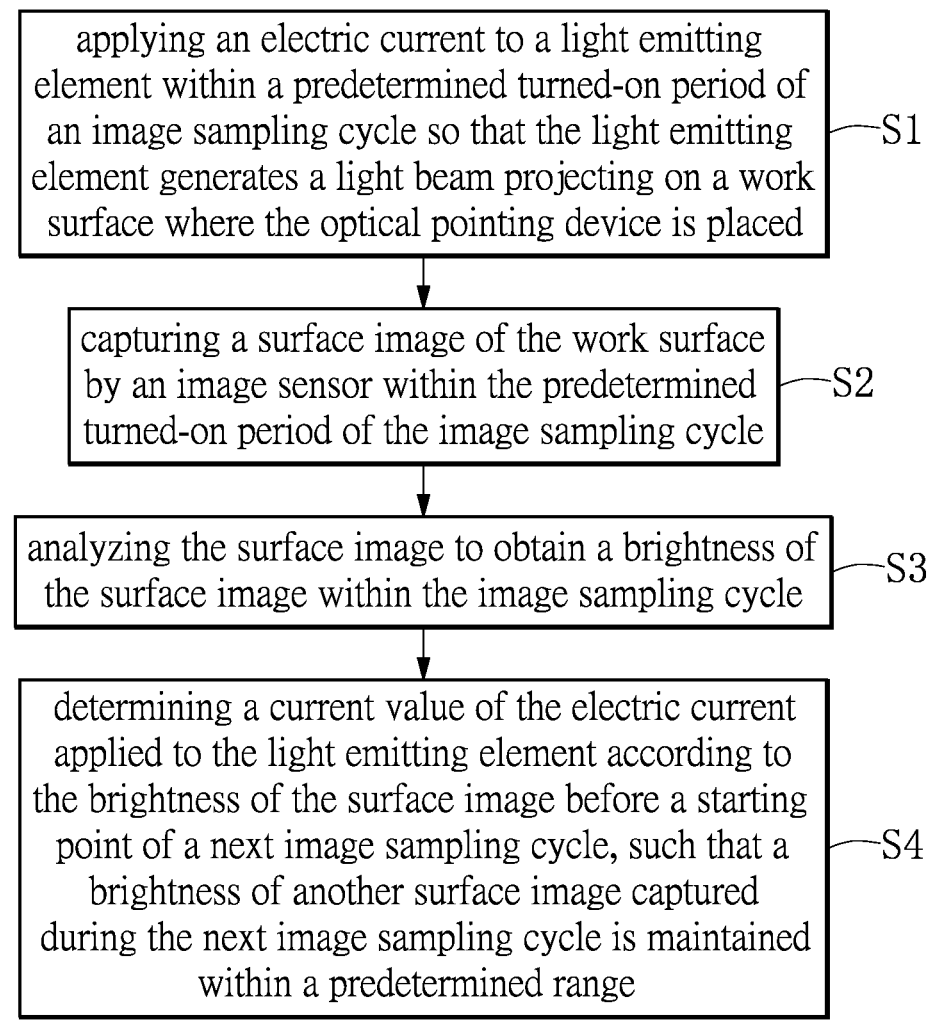
FIG. 2 is a flowchart of a lighting control method of the optical pointing device according to one embodiment of the present disclosure.

Reference is made to FIG. 2, which is a flowchart of a lighting control method of the optical pointing device according to one embodiment of the present disclosure. The lighting control method in the instant embodiment can be executed by the optical pointing device 1 shown in FIG. 1, but the present disclosure is not limited thereto. When the optical pointing device 1 is moved over the dark-colored region or the light-colored region, by executing the lighting control method provided herein, the frame rate of the image sensor 102 or the image sampling cycle can be prevented from being frequently changed.

Referring to FIG. 2 (which is to be read in conjunction with FIG. 1), in step S1, an electric current is applied to a light emitting element for a predetermined turned-on period in an image sampling cycle, so that the light emitting element generates a light beam projecting on a work surface where the optical pointing device is placed.

That is to say, the processor 11 controls the light emitting element 100 to be turned on through the driving circuit 101. Furthermore, the electric current having an initial preset current value is applied by the driving circuit 101 to the light emitting element 100 for the predetermined turned-on period.

In step S2, a surface image of the work surface is captured by an image sensor 102 within the predetermined turned-on period of the image sampling cycle. Specifically, during the predetermined turned-on period, the processor 11 can control a shutter time of the image sensor 102, so as to capture the surface image. In the instant embodiment, a length of the predetermined turned-on period is usually fixed, so as to maintain the frame rate at a preset value.

In step S3, the surface image is analyzed to obtain a brightness of the surface image within the image sampling cycle.

As mentioned above, the surface image captured by the image sensor 102 is transmitted to and processed by the processor 11. While the surface image is processed by the processor 11, the light emitting element 100 is turned off for a predetermined turned-off period in the image sampling cycle by the driving circuit 101.

Furthermore, the surface image has a plurality of pixels respectively having brightness values. In one embodiment, the processor 11 can calculate a statistical data according to the brightness values of the pixels, so as to determine whether the brightness of the surface image falls within the predetermined range. For example, the statistical data includes at least one of an accumulation, an average, a maximum, a minimum, a mean, a variance, a standard deviation of the brightness values, and a count of saturated pixels, but the present disclosure is not limited to the examples provided herein. It is worth mentioning that for the saturated pixels, the brightness values thereof each exceed a brightness threshold value.

Reference is made to FIG. 2. In step S4, the current value of the electric current applied to the light emitting element 100 is determined according to the brightness of the surface image before a starting point of a next image sampling cycle, such that a brightness of another surface image captured during the next image sampling cycle is maintained within a predetermined range. Specifically, the processor 11 can determine the current value of electric current according to the brightness of the surface image.

Figure 3:
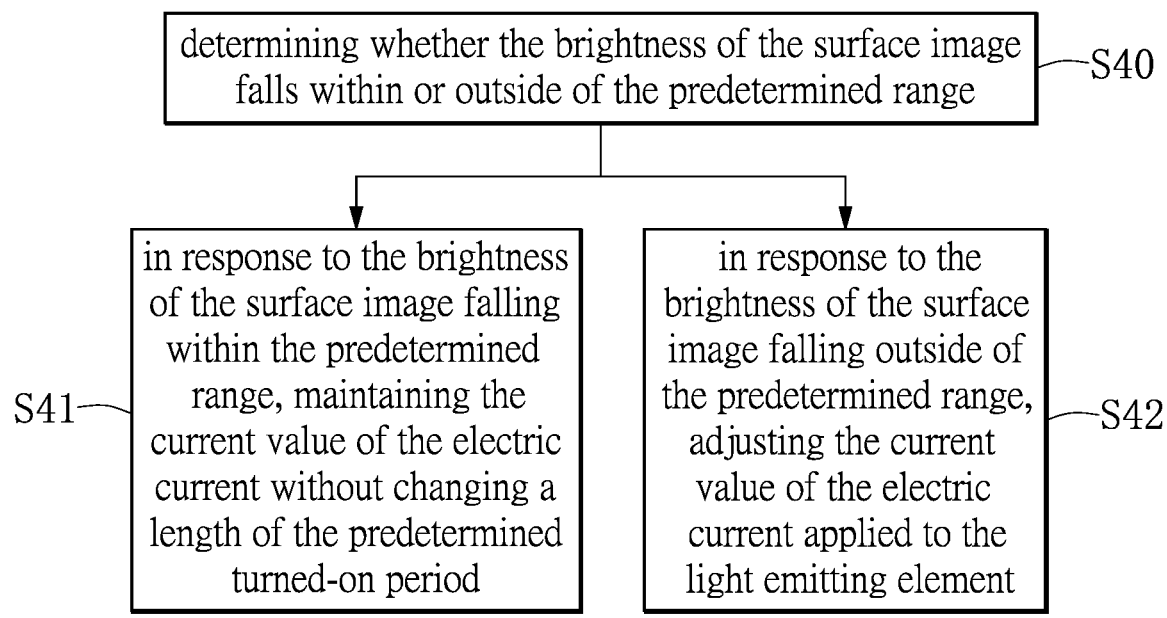
FIG. 3 is a flowchart illustrating a step of determining a current value of an electric current applied to a light emitting element according to a brightness of a surface image according to one embodiment of the present disclosure.

Reference is made to FIG. 3, which is a flowchart illustrating a step of determining a current value of an electric current applied to a light emitting element according to a brightness of a surface image according to one embodiment of the present disclosure. In step S40, whether the brightness of the surface image falls within or outside of the predetermined range is determined.

When the brightness of the surface image falls within the predetermined range, the lighting control method proceeds to step S41. When the brightness of the surface image falls outside of the predetermined range, the lighting control method proceeds to step S42.

In one embodiment, the processor 11 can determine whether the brightness of the surface image falls within or outside of the predetermined range depending on the accumulation, the average, the maximum, the minimum, the mean, the variance, the standard deviation, the count of saturated pixels, or any combination thereof.

In the instant embodiment, the statistical data including the accumulation and the maximum of the brightness values is taken as an example to describe the details of the step S40. The processor 11 can determine whether the accumulation of the brightness value falls within a first brightness range and whether the maximum of the brightness values falls within a second brightness range.

When the accumulation of the bright values falls within the first brightness range and the maximum of the brightness value falls within the second brightness range, the processor 11 determines that the brightness of the surface image is maintained within the predetermined range, and the lighting control method proceeds to step S41.

However, when either the accumulation of the bright values falls outside of the first brightness range or the maximum of the brightness value falls outside of the second brightness range, the processor 11 determines that the brightness of the surface image falls outside of the predetermined range, and the lighting control lighting control method proceeds to step S42.

In another embodiment, the processor 11 can determine whether the lighting control method proceeds to step S41 or step S42 by either the accumulation or the maximum of the bright values, but the present disclosure is not limited thereto.

In step S41, in response to the brightness of the surface image falling within the predetermined range, the current value of the electric current applied to the light emitting element 100 is maintained. Specifically, the current value of the electric current can be maintained at the initial preset current value or the current value that has been determined when the previous image sampling cycle ends. Furthermore, in step S41, the length of the predetermined turned-on period is not changed.

In step S42, in response to the brightness of the surface image falling outside of the predetermined range, the current value of the electric current applied to the light emitting element 100 is adjusted.

In one embodiment, the processor 11 adjusts the current value of the electric current through the driving circuit 101. Furthermore, under some conditions, neither the predetermined turned-on period nor the amplifier gain is changed during adjustment of the current value of the electric current applied to the light emitting element 100.

However, under another condition, the processor 11 may adjust not only the current value of the electric current, but also at least one of the amplifier gain and a length of the predetermined turned-on period. For example, the processor 11 may adjust the current value of the electric current and the length of the predetermined turned-on period when the brightness of the surface image falls outside of the predetermined range.

Figure 4:
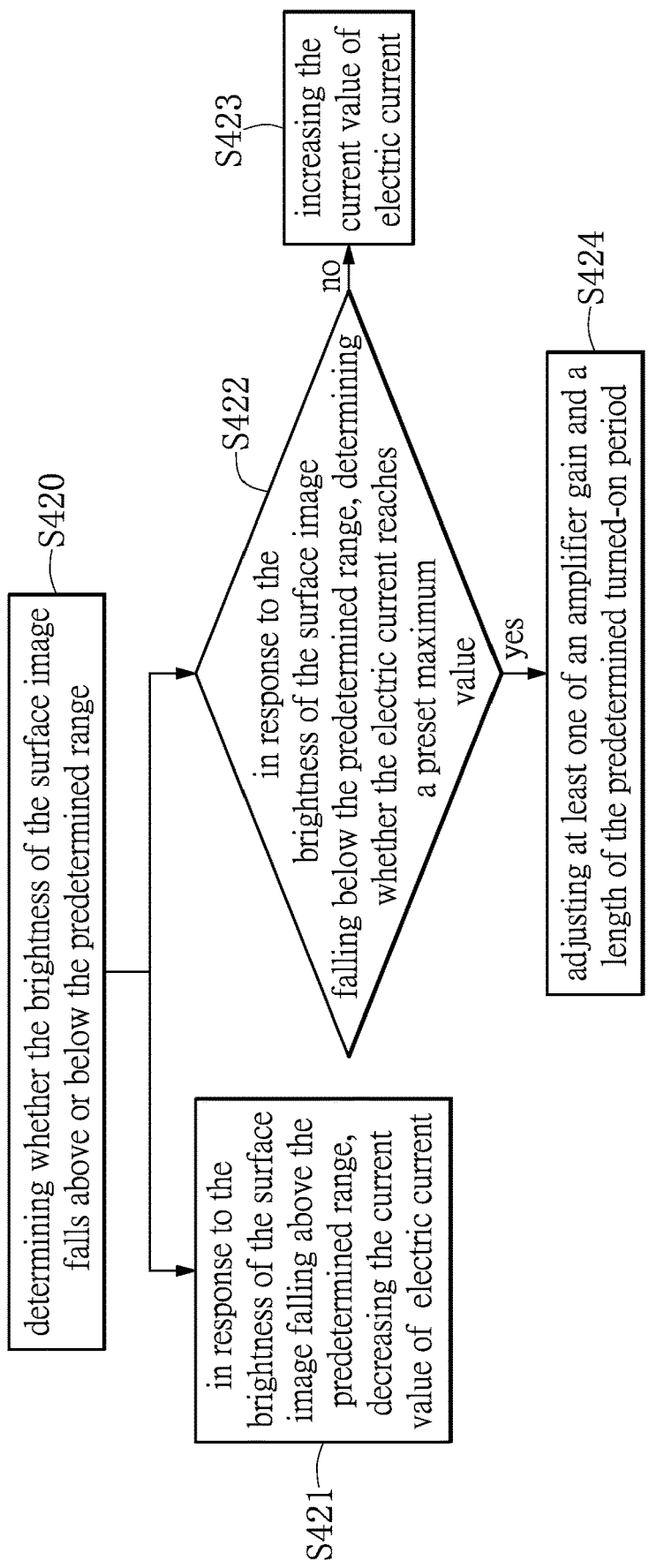
FIG. 4 is a flowchart illustrating a step of adjusting the current value of the electric current according to one embodiment of the present disclosure.

Reference is made to FIG. 4, which is a illustrating a step of adjusting the current value of the electric current according to one embodiment of the present disclosure.

In step S420, whether the brightness of the surface image falls above or below the predetermined range is determined. Specifically, the processor 11 can determine whether the brightness of the surface image is greater than a maximum value of the predetermined range or less than a minimum value of the predetermined range according to the aforementioned statistical data.

In one embodiment, the statistical data includes the count of saturated pixels, the accumulation and the maximum of the brightness values of the pixels. When the maximum of the brightness values of the pixels falls above the second brightness range, and the count of the saturated pixels is greater than a threshold number, the processor 11 determines that the brightness of the surface image falls above the predetermined range. As such, the lighting control method proceeds to step S421.

In step S421, in response to the brightness of the surface image falling above the predetermined range, the electric current is decreased. That is to say, the surface image captured by the image sensor 102 may be too bright to be analyzed. Accordingly, the processor 11 can control the driving circuit 101 to decrease the current value of the electric current applied to the light emitting element 100, such that the brightness of the surface image captured during the next image sampling cycle can be reduced.

In one example, a percentage by which the current value of the electric current is decreased can be determined according to a difference between the brightness of the surface image and the maximum value of the predetermined range. That is to say, the larger the difference between the brightness of the surface image and the maximum value of the predetermined range is, the more the current value of the electric current is decreased.

In another embodiment, the current value of the electric current can be decreased by a fixed current value (ΔI) before the starting point of the next image sampling cycle. Accordingly, the current value of the electric current can be determined according to the brightness of the surface image.

On the other hand, when the accumulation of the brightness values falls below the first brightness range, and the maximum of the brightness values falls below the second brightness range, the processor 11 determines that the brightness of the surface image falls below the predetermined range. As such, the lighting control method proceeds to step S422.

However, the present disclosure is not limited to the example provided herein. In another embodiment, other conditions, such as the mean, the variance, or the standard deviation of the brightness values, may be taken into account to determine whether the brightness of the surface image falls above or below the predetermine range.

Reference is made to FIG. 4. In step S422, in response to the brightness of the surface image falling below the pre-determined range, whether the electric current reaches a preset maximum value is determined.

If the processor 11 determines that the electric current does not reach the preset maximum value, the lighting control method proceeds to step S423. In step S423, the current value of the electric current is increased. Specifically, the processor 11 controls the driving circuit 101 to increase the current value of the electric current applied to the light emitting element 100, so as to decrease the brightness of the surface image. The electric current can be increased unless either the brightness of the surface image is maintained within the predetermined range or the electric current reaches the preset maximum value.

Furthermore, a percentage by which the current value is increased can be determined according to a difference between the brightness of the surface image and the minimum value of the predetermined range. That is to say, the larger the difference between the brightness of the surface image and the minimum value of the predetermined range is, the more the current value of the electric current is increased.

However, if the processor 11 determines that the electric current reaches the preset maximum value, the lighting control method proceeds to step S424. In step S424, at least one of the amplifier gain and the length of the predetermined turned-on period is adjusted.

As mentioned above, the predetermined turned-on period can include the pre-flash stage and the open shutter stage. When the electric current reaches the preset maximum value, at least one of durations of the pre-flash stage and the open shutter stage is prolonged, so as to change the length of the predetermined turned-on period. That is to say, the processor 11 can prolong the duration of the pre-flash stage and/or the duration of the open shutter stage.

In another embodiment, the predetermined turned-on period can include only the open shutter stage. When the current value electric current reaches the preset maximum value, the processor 11 can prolong the duration of the open shutter stage.

However, in another embodiment, even though the electric current has not yet reached the preset maximum value, the processor 11 can adjust not only the current value of the electric current, but also at least one of the amplifier gain and the length of the predetermined turned-on period. For example, under a situation where the brightness of the surface image is way less than a minimum value of the predetermined range, not only is the current value of the electric current applied to the light emitting element 100 increased, but at least one of the amplifier gain and the length of the predetermined turned-on period is also increased. As such, the brightness of the surface image captured by the image sensor 102 at the next image sampling cycle can be immediately adjusted.

It should be noted that in the abovementioned embodiment, adjusting the electric current takes priority over adjusting the length of the predetermined turned-on period and the amplifier gain. That is to say, unless the electric current reaches the preset maximum value or the brightness of the surface image is way less than a minimum value of the predetermined range, the length of the predetermined turned-on period and the amplifier gain will usually be fixed. As such, the time length of the image sampling cycle can usually be maintained at a preset length. In other words, whether the optical pointing device 1 is moved over the dark-colored region or the light-colored region, the frame rate of the image sensor 102 can usually be maintained at the preset value during the operation of the optical pointing device 1, rather than being frequently changed.

After the step S4 is performed, the image sampling cycles is completed, and then the method may proceed back to step S2, so as to start a next image sampling cycle. Thereafter, step S2 to step S4 are repeated.

Figure 5:
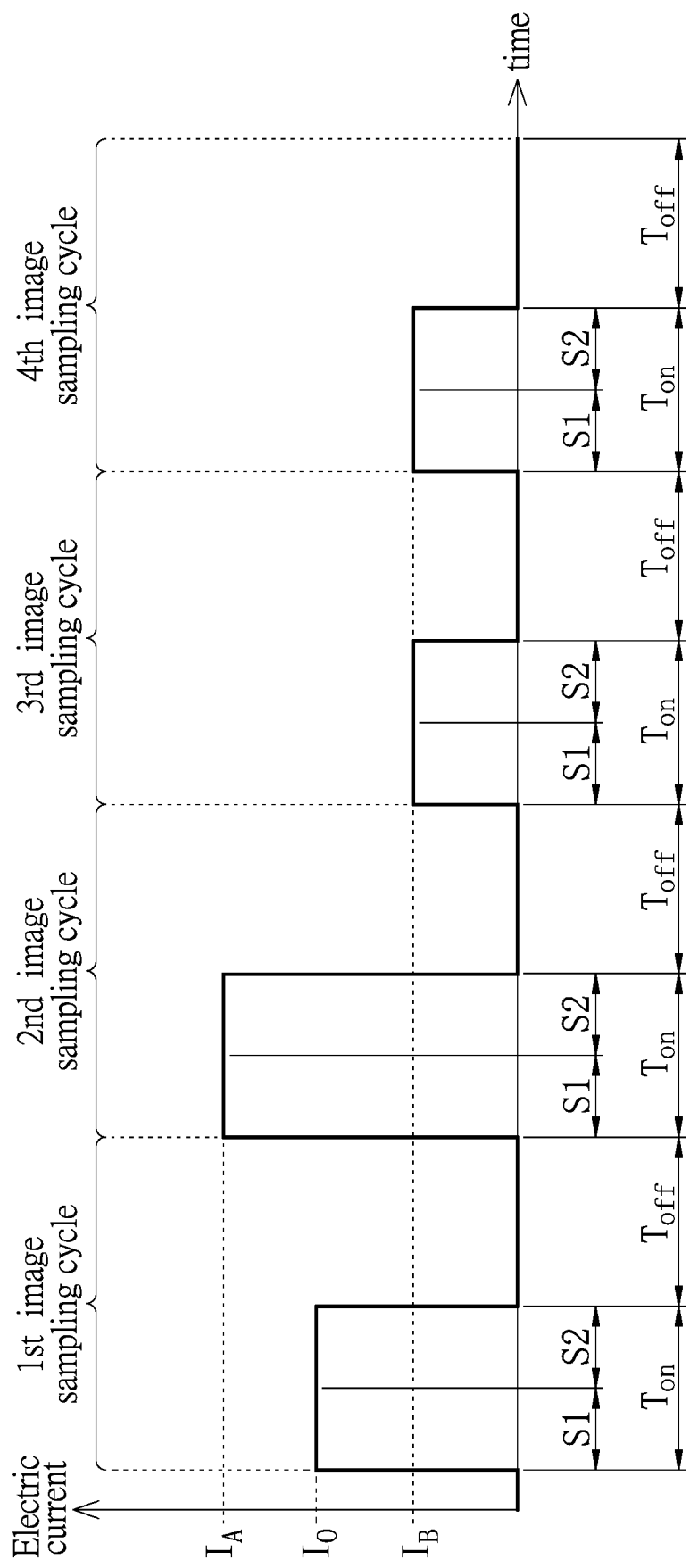
FIG. 5 shows a schematic timing waveform of the light emitting element according to one embodiment of the present disclosure.

Reference is made to FIG. 5, which shows a schematic timing waveform of the light emitting element according to one embodiment of the present disclosure. However, the timing waveform shown in FIG. 5 is exemplified for descriptive purposes only, and is not intended to limit the present disclosure. As shown in FIG. 5 (which is to be read in conjunction with FIG. 1 and FIG. 2), during the operation of the optical pointing device 1, the electric current applied to the light emitting element 100 may be varied in different image sampling cycles.

Specifically, during the first image sampling cycle, the light emitting element 100 is turned on and applied with the electric current of the initial preset current value $I_0$ within the predetermined turned-on period $T_{on}$, and step S2 of the lighting control method provided in FIG. 2 is performed. In the instant example, the predetermined turned-on period $T_{on}$ includes two stages, i.e., a pre-flash stage S1 and an open shutter stage S2.

Subsequently, step S3 and step S4 of the lighting control method provided in FIG. 2 can be performed. Meanwhile, the light emitting element 100 is turned off for the predetermined turned-off period $T_{off}$ during step S3 and step S4, so as to reduce the power consumption. In the example shown in FIG. 5, after a first surface image captured during the first image sampling cycle is analyzed, the brightness of the first surface image falls below the predetermined range. Accordingly, the current value of the electric current is increased from the initial preset current value $I_0$ to a first value $I_A$, and then step S2 through S4 are repeated to start the second image sampling cycle.

That is to say, during the second image sampling cycle, the electric current of the first value $I_A$ is applied to the light emitting element 100 within the predetermined turned-on period $T_{on}$. Furthermore, a second surface image is captured by the image sensor 102 during the second image sampling cycle. Since the work surface may have alternately-distributed darker and lighter colored regions, the optical pointing device 1 can be moved only from the darker colored region to the lighter colored region, which causes the brightness of the second surface image to fall above the predetermined range. Accordingly, the electric current is decreased from the first value $I_A$ to a second value $I_B$, and step S2 through S3 are repeated to start a third image sampling cycle.

In the example shown in FIG. 5, the second value $I_B$ is less than the initial preset current value $I_0$, but the present disclosure is not limited thereto. During the third image sampling cycle, the electric current of the second value $I_B$ is applied to the light emitting element 100 for the predetermined turned-on period $T_{on}$. Furthermore, a third surface image is captured by the image sensor 102. In the example shown in FIG. 4, it is assumed that the brightness of the third surface image falls within the predetermined range. Accordingly, the electric current is not varied in the next image sampling cycle (a fourth image sampling cycle). In other words, the electric current will be maintained at a preset value (the second value $I_B$) that has been set in the previous image sampling cycle, i.e., the third image sampling cycle.

In another example, the second value $I_B$ may be greater than the initial preset current value $I_0$. Furthermore, the electric current can be decreased by a fixed value ($\Delta I$) in each image sampling cycle. That is to say, the electric current can be decreased step by step in the subsequent image sampling cycles according to practical requirements.

It should be noted that in the example shown in FIG. 5, since only the current value of the electric current is adjusted, the predetermined turned-on periods $T_{on}$ in the first to fourth image sampling cycles have the same length. As such, the first to fourth image sampling cycles have the same time length, and the frame rate of the optical pointing device 1 is not changed.

Figure 6:
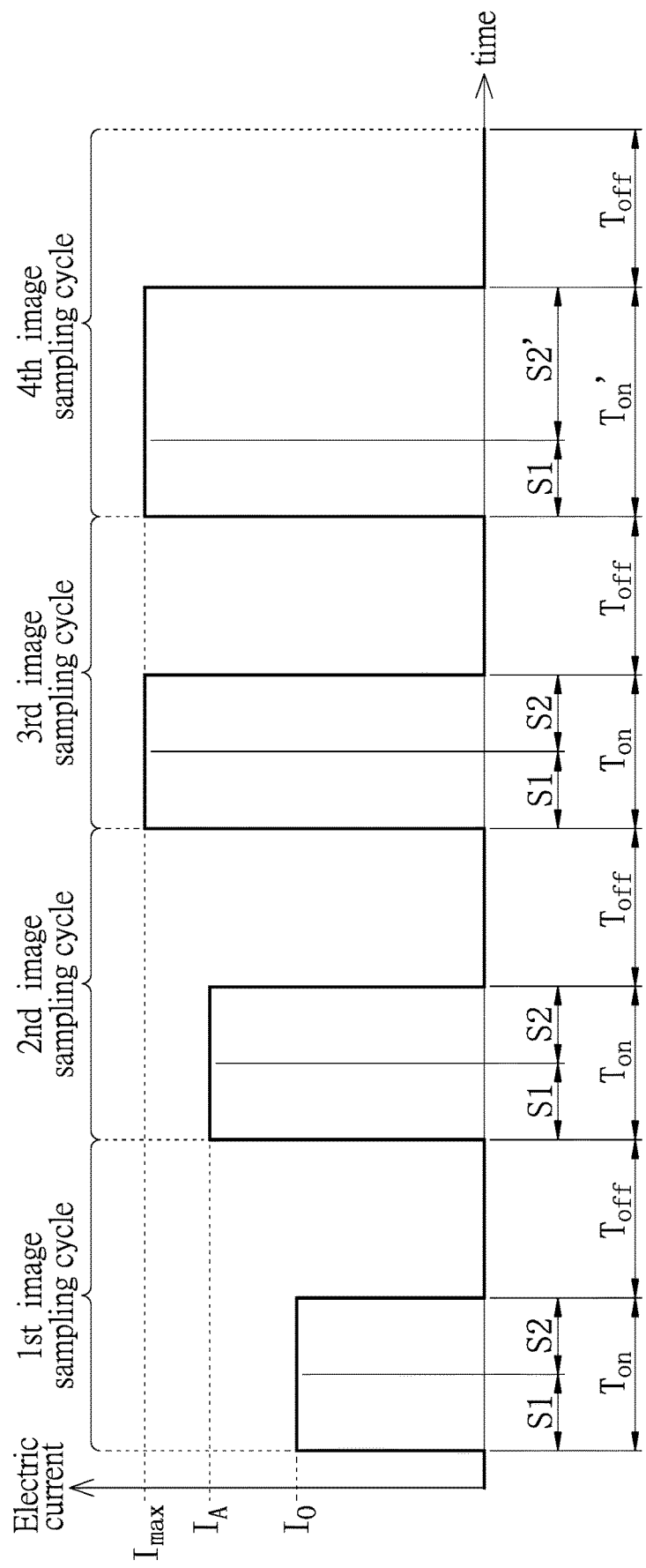
FIG. 6 shows a schematic timing waveform of the light emitting element according to one embodiment of the present disclosure.

Reference is made to FIG. 6, which shows a schematic timing waveform of the light emitting element according to one embodiment of the present disclosure. However, the timing waveform shown in FIG. 6 is exemplified only for description, and is not intended to limit the present disclosure.

A difference between the instant example and the previous example shown in FIG. 5 is that during the second image sampling cycle, the surface image captured by the image sensor 102 may not be bright enough to be analyzed. That is to say, the brightness of the surface image still falls below the predetermined range even though the electric current has been increased from the initial preset current value $I_0$ to the first value $I_A$. Accordingly, the electric current is increased again during the third sampling cycle. As shown in FIG. 6, the electric current is increased from the first value $I_A$ to the preset maximum value $I_{max}$.

However, in the example shown in FIG. 6, during the third image sampling cycle, the third surface image captured by the image sensor 102 is still not bright enough for analyzing and tracking even through the electric current of the preset maximum value $I_{max}$ has been applied to the light emitting element 100. Referring to FIG. 6 (which is to be read in conjunction with step S44 shown in FIG. 3), the length of a predetermined turned-on period $T_{on}'$ is increased during the fourth image sampling cycle. Specifically, the duration of an open shutter stage S2' is prolonged, such that the predetermined turned-on period $T_{on}'$ has a longer length, but the present disclosure is not limited thereto. In another example, the duration of the pre-flash stage S1 can also be prolonged, or the durations of the pre-flash stage S1 and the open shutter stage S2' are both prolonged.

Accordingly, in the example shown in FIG. 6, the first to third image sampling cycles have the same time length, but the fourth image sampling cycle has a longer time length. It should be noted that the time length of the fourth image sampling cycle may be shortened in the following image sampling cycle.

Beneficial Effects of the Embodiments

In conclusion, one of the advantages of the lighting control method of the optical pointing device provided by the present disclosure is that, by virtue of "determining a current value of the electric current applied to the light emitting element according to the brightness of the surface image before a starting point of a next image sampling cycle, such that a brightness of another surface image captured during the next image sampling cycle is maintained within a predetermined range," the frame rate of the image sensor 102 can be maintained at a preset value.

Specifically, in the lighting control method provided in the embodiment of the present disclosure, adjusting the electric current takes priority over adjusting the length of the predetermined turned-on period and the amplifier gain. Accordingly, whether the optical pointing device 1 is moved over to the dark-colored region or the light-colored region, the frame rate or the time length of the image sampling cycle is not frequently changed.

In addition, the lighting control method allows the time length of the image sampling cycle of the optical pointing device 1 to be shortened, which is beneficial for increasing the frame rate. The higher the frame rate, the higher the tracking speed of the optical pointing device 1. Accordingly, the tracking speed and the acceleration performance of the optical pointing device 1 that executes the lighting control method can both be improved.

Furthermore, when the optical pointing device 1 is operated on a lighter colored surface, the electric current applied to the light emitting element 100 can be reduced, so that the current consumption of the light emitting element 100 can be minimized. Compared to a conventional optical mouse, the current consumption of the optical pointing device 1 can be decreased by 30%.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A lighting control method of an optical pointing device, comprising:
    applying an electric current to a light emitting element within a predetermined turned-on period of an image sampling cycle, so that the light emitting element generates a light beam that is projected on a work surface where the optical pointing device is placed;
    capturing a surface image of the work surface by an image sensor within the predetermined turned-on period of the image sampling cycle;
    analyzing the surface image to obtain a brightness of the surface image within the image sampling cycle; and
    determining a current value of the electric current applied to the light emitting element according to the brightness of the surface image before a starting point of a next image sampling cycle, such that a brightness of another surface image captured during the next image sampling cycle is maintained within a predetermined range.

2. The lighting control method according to claim 1, wherein, during the step of determining the current value of the electric current, a length of the predetermined turned-on period is not changed.

3. The lighting control method according to claim 1, wherein the step of determining the current value of the electric current according to the brightness of the surface image includes:
    determining whether the brightness of the surface image falls within or outside of the predetermined range;
    in response to the brightness of the surface image falling outside of the predetermined range, adjusting the current value of the electric current applied to the light emitting element; and
    in response to the brightness falling within the predetermined range, maintaining the current value of the electric current without changing a length of the predetermined turned-on period.

4. The lighting control method according to claim 3, wherein the step of adjusting the current value of the electric current applied to the light emitting element includes:
    determining whether the brightness of the surface image falls within, above or below the predetermined range;
    in response to the brightness of the surface image falling below the predetermined range, determining whether the electric current reaches a preset maximum value;
    in response to the electric current reaching the preset maximum value, adjusting at least one of an amplifier gain or the length of the predetermined turned-on period; and
    in response to the electric current not reaching the preset maximum value, increasing the current value of the electric current.

5. The lighting control method according to claim 4, wherein the predetermined turned-on period includes a pre-flash stage and an open shutter stage; wherein, when the electric current reaches the preset maximum value, at least one of durations of the pre-flash stage and the open shutter stage is prolonged, so as to change the length of the predetermined turned-on period.

6. The lighting control method according to claim 4, wherein the predetermined turned-on period includes an open shutter stage; wherein, when the electric current reaches the preset maximum value, a duration of the open shutter stage is prolonged, so as to change the length of the predetermined turned-on period.

7. The lighting control method according to claim 4, wherein the step of adjusting the current value of the electric current applied to the light emitting element further includes: in response to the brightness of the surface image falling above the maximum value of the predetermined range, decreasing the current value of the electric current.

8. The lighting control method according to claim 3, wherein the surface image has a plurality of pixels having respective brightness values, and wherein the step of analyzing the surface image to obtain the brightness of the surface image within the image sampling cycle includes:
    calculating a statistical data according to the brightness values of the pixels, wherein the statistical data includes at least one of an accumulation, an average, a maximum, a minimum, a mean, a variance, a standard deviation of the brightness values, and a count of saturated pixels.

9. The lighting control method according to claim 8, wherein the statistical data includes the accumulation and the maximum of the brightness values, and the step of determining whether the brightness of the surface image falls within or outside of the predetermined range further includes:
    determining whether the accumulation of the brightness value falls within a first brightness range and whether the maximum of the brightness values falls within a second brightness range; and
    determining that the brightness of the surface image falls outside of the predetermined range when the accumulation of the brightness values does not fall within the first brightness range or the maximum of the brightness values does not fall within the second brightness range.

10. The lighting control method according to claim 9, wherein the step of determining whether the brightness of the surface image falls within or outside of the predetermined range further includes:
    determining that the brightness of the surface image is maintained within the predetermined range when the accumulation of the bright values falls within the first brightness range and the maximum of the brightness value falls within the second brightness range.

11. The lighting control method according to claim 1, wherein the step of determining the current value of the electric current applied to the light emitting element according to the brightness of the surface image includes:
    determining whether the brightness of the surface image falls within or outside of the predetermined range;
    in response to the brightness of the surface image falling outside of the predetermined range, adjusting the current value of the electric current applied to the light emitting element and adjusting at least one of an amplifier gain and a length of the predetermined turned-on period; and
    in response to the brightness falling within the predetermined range, maintaining the current value of the electric current without changing a length of the predetermined turned-on period.

12. The lighting control method according to claim 1, wherein, during the step of analyzing the surface image to obtain the brightness of the surface image within the image sampling cycle, the light emitting element is turned off for a predetermined turned-off period in the image sampling cycle.

* * * * *